United States Patent [19]

Babel

[11] Patent Number: 4,529,342

[45] Date of Patent: Jul. 16, 1985

[54] INDEXING ATTACHMENT

[75] Inventor: Werner Babel, Pfronten-Meilingen, Fed. Rep. of Germany

[73] Assignee: Maho Werzeugmaschinenbau Babel & Co., Fed. Rep. of Germany

[21] Appl. No.: 494,944

[22] Filed: May 16, 1983

[30] Foreign Application Priority Data

May 27, 1982 [DE] Fed. Rep. of Germany ....... 3220026

[51] Int. Cl.$^3$ ............................................. B23D 7/08
[52] U.S. Cl. .................................. 409/164; 409/174; 409/221; 409/224
[58] Field of Search ........................ 29/563, 568, 564; 409/221, 222, 223, 224, 159, 161, 162, 163, 164, 165, 168, 172, 173, 174, 197, 198, 205

[56] References Cited

U.S. PATENT DOCUMENTS

| 2,045,685 | 6/1936 | Archea | 409/223 |
| 2,953,975 | 9/1960 | Hoglund | 409/223 |
| 3,054,333 | 9/1962 | Brainard et al. | 409/221 X |
| 3,533,328 | 10/1970 | Wyssbrod | 409/221 X |
| 3,572,207 | 3/1971 | Fleming | 409/221 X |
| 3,587,390 | 6/1971 | Lohneis | 409/221 |
| 3,986,617 | 10/1976 | Blomquist | 409/221 |
| 4,090,287 | 5/1978 | Selander | 29/568 |

FOREIGN PATENT DOCUMENTS 1777127 9/1968 Fed. Rep. of Germany.
2102878 1/1971 Fed. Rep. of Germany.

*Primary Examiner*—William R. Briggs
*Assistant Examiner*—Glenn L. Webb
*Attorney, Agent, or Firm*—Kenway & Jenney

[57] ABSTRACT

The invention is directed to an indexing attachment for a numerically controlled milling machine, comprising an indexing spindle rotatably supported in the casing for receiving a workpiece chuck, a bottom plate for fixing the casing on a worktable, and clamping means for fixing the indexing spindle in the various indexing positions. The indexing attachment is to be of simple and inexpensive structure and intended to permit—without any drive means of its own—programme-controlled indexing operations and thus milling steps along five axes. To this end the indexing spindle (10) of the indexing attachment (8) is adapted to be coupled with a driver (4) mounted on a part (2) of the milling machine and to be driven by programme-controlled motions of the milling machine. The end face of the indexing spindle (10) may be fixedly connected to a plate (12), said plate being formed with an eccentrically located recess (13) for engagement with the driver (4), which driver may be in the form of a pin capable of being clamped in the main spindle (3).

4 Claims, 1 Drawing Figure

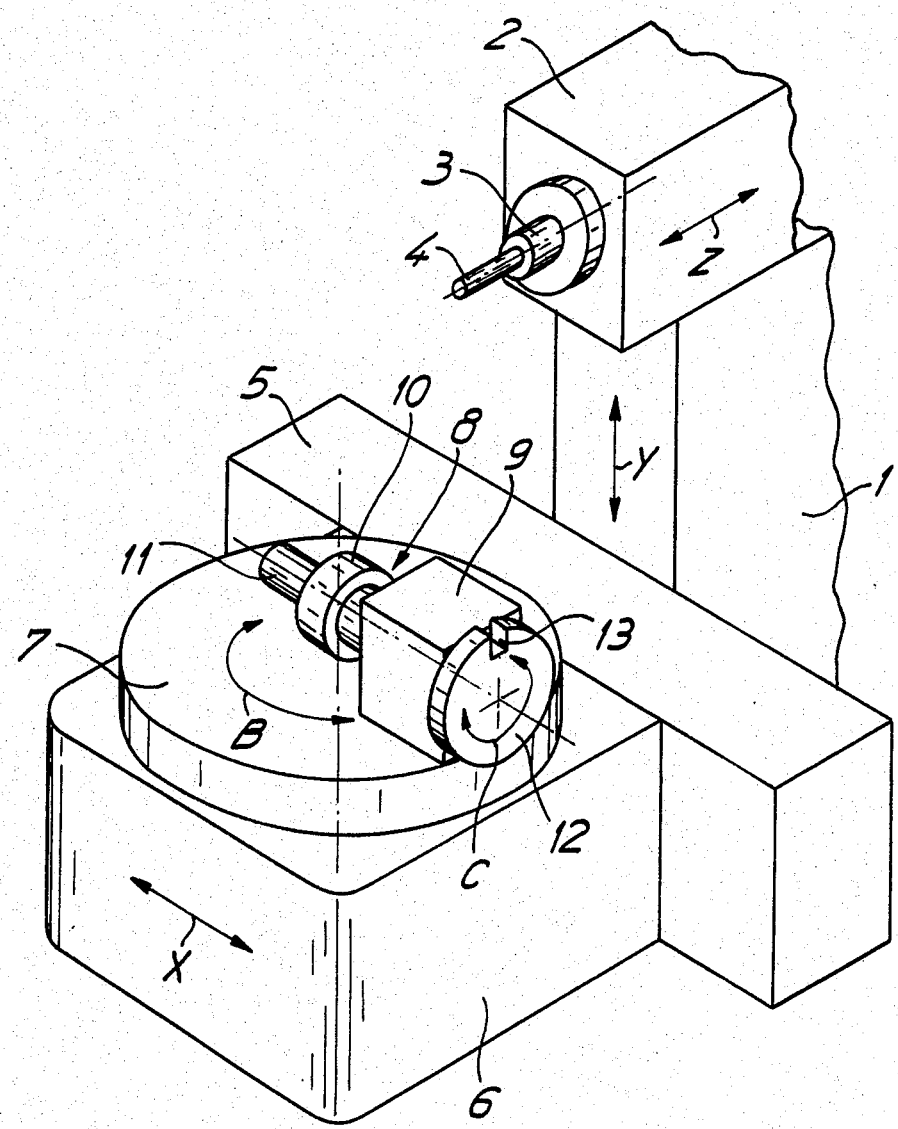

INDEXING ATTACHMENT

The present invention is directed to an indexing attachment for a numerically controlled milling machine, comprising an indexing spindle rotatably supported in the casing for receiving a workpiece mounting, a bottom plate for fixing the casing on a worktable, and clamping means for locating the indexing spindle in the various indexing positions.

Indexing attachments are accessory units, especially for universal-type milling machines, which permit rotation of the clamped workpieces into predetermined indexing positions and thus machining of the workpieces along an additional axis. Various examples of indexing attachments have been known, viz., for direct indexing by means of a graduated plate, for indirect indexing through a separate driving motor and a worm gear, and for differential indexing. To perform direct indexing by means of the graduated plate a number of manual operations are required, so that fully automatic operation and integration into the programme control of the milling machine are impossible. Although indexing attachments including a worm gear and a graduated plate for indirect indexing may be incorporated in the programme control of the milling machine, they are technically complex and therefore expensive due to the additional driving motor and the worm gear.

It is the object of the present invention to provide an indexing attachment for numerically controlled milling machines, which is of simple structure and permits—without the use of a separate drive means—a programme-controlled sequence of indexing motions of the workpieces. In accordance with the present invention this object is solved in that the indexing spindle of the indexing attachment is adapted to be coupled with a driver mounted on a part of the milling machine and to be driven by program-controlled motions of the milling machine.

In particular, the indexing attachment according to the present invention has been conceived for smaller and simple numerically controlled milling machines, in which it is only sometimes necessary to perform workpiece milling operations along an additional axis. When stationary worktables are used, the indexing attachment is mounted on the worktable in such a way that its longitudinal axis extends in parallel to the headstock longitudinal axis. For each indexing operation the worktable together with the mounted indexing head and the worktable carriage is vertically moved along the upright until the driver, which is mounted on the headstock and appropriately in the chuck of the main spindle, may be coupled with the spindle of the indexing attachment. By means of a simultaneous combined movement of the worktable carriage along the upright along the vertical axis and of the worktable relative to the carriage along the horizontal axis, the indexing attachment will, when the clamping of the indexing spindle has been released, perform a circular motion within a predetermined angular range, which will result in a corresponding rotation of the indexing spindle and of the workpiece clamped therein.

A basically similar sequence of motions may be obtained when a rotary table is used, in which case the indexing attachment may be mounted on the rotary table in any desired angular position. At the commencement of each indexing operation, however, the rotary table will have to be rotated about its vertical axis into a position in which the longitudinal axis of the indexing spindle extends in axially parallel relationship to the longitudinal axis of the headstock of the milling machine. When the rotary table has reached this position, the vertical movement of the worktable carriage relative to the upright will take place so as to couple the driver with the indexing spindle. When the clamping of the indexing spindle has been released, the indexing movement will occur due to the combined circular motion of the worktable. After completion of the indexing operation and renewed clamping of the indexing spindle, the coupling will be released e.g. by a return motion of the headstock, and the driver clamped in the chuck of the main spindle may automatically be exchanged in the usual manner for a machining tool.

The concept of the indexing attachment according to the present invention results in the considerable advantage that a workpiece may be machined along five axes, while the indexing attachment comprises only a few separate parts, viz., merely the spindle including the bearings therefor in the casing, the clamping means, and a coupling element non-rotatably joined to the spindle, which is suitably a plate formed with a receptacle for the driver. In this connection it is of particular significance that a separate drive mechanism with a gear unit is not required, because the indexing spindle is driven by the motions of the worktable, the vertical carriage, and/or the headstock. The subclaims constitute suitable further developments of the present invention.

An embodiment of the present invention will be described below with reference to the appended drawing, the single FIGURE of which is a perspective view of the essential parts of a milling machine in combination with the indexing attachment according to the invention.

The milling machine comprises an upright 1 on the top horizontal surface of which a headstock 2 is disposed to be movable in z-axis direction by means of driving and guide means, which are not shown. A carrier pin 4 is mounted in the horizontal spindle 3 supported in the headstock 2, which pin constitutes a driver. At the vertical end face of the upright 1 a carriage 5 is disposed to be movable in y-axis direction. This carriage 5 is provided with guide means for a worktable 6, which is mounted at the carriage front so as to be movable in x-axis direction through driving means (not shown). The worktable top carries a rotary table 7 adapted to rotate about a vertical axis B. An indexing attachment 8 according to the invention is mounted on the work area of this rotary table 7. Inside a casing 9 of said indexing attachment an indexing spindle 10 is rotatably mounted, which includes chuck means 11 for receiving workpieces, which are not shown. This indexing spindle 10 is supported in the casing 9 to be rotatable about a horizontal axis C and is fixed in the predetermined index positions by clamping means (not shown). The indexing spindle 10 is non-rotatably joined to a plate 12 which in the present embodiment is disposed in front of the forward end face of the casing 9. The outer periphery of the plate 12 is formed with a recess 13 in the form of a hole or slot, and during the indexing operation the carrier pin 4 will be in engagement therewith.

With the embodiment described above, an indexing operation will be performed as follows:

The driving means (not shown) for the rotary table is started and rotates the table 7 into a position in which the axis C of the indexing attachment 8 extends in parallel to the z-axis of the headstock 2. Either subsequently or simultaneously with the rotary movement the worktable 6 is moved in the direction of the x-axis in such a way that the slot 13 is in exact vertical register beneath the carrier pin 4. The angular position of the clamped plate 12 and thus the respective position of the slot 13 is contained in the programmed control. The headstock 2 is moved backwards in z-axis direction, and the carriage 5 is moved upwards until the slot 13 is accurately positioned in front of the pin 4. Thereupon the headstock 2 advances until the pin 4 engages in the slot 13. When the clamped state of the indexing spindle 10 is released, there results a combined movement of the carriage 5 in vertical or y-direction and of the worktable 6 in the horizontal or x-direction. Due to this combined movement the indexing attachment performs a circular motion resulting in a turning of the indexing spindle 10 about the axis C at the predetermined indexing angle. When this turning motion of the indexing spindle 10 has been completed, the clamping means is again actuated, and the headstock 2 will be retracted, whereby the carrier pin 4 is disengaged from the slot 13 formed in the plate 12 so that this coupling is released thereby. Thereupon the carriage 5, the worktable 6 and the rotary table 7 return to the predetermined operating position, in which the workpiece may again be machined when the carrier pin 4 has been automatically exchanged for a machining tool.

The indexing attachment as described is especially suitable for applications where it happens only from time to time that workpieces have to be machined along a fifth axis. For those users the invention offers the advantage that the indexing operations may also be performed by programme control, while an increase in capital cost for the indexing attachments common so far for this purpose and including a separate drive mechanism and a worm gear will not be incurred.

The invention is not limited to the embodiment shown and described above. For instance, it is possible to provide the carrier pin also on a vertical milling head and to provide instead of the slot-like recess 13 in the plate 12 another coupling element, e.g. a ball stud, which may be gripped by the possibly pliers-like carrier pin. Furthermore, it is possible to provide the plate 12 with an external gear rim which meshes with a toothed rack mounted on the carriage surface.

I claim:

1. Indexing apparatus for a numerically controlled milling machine having a main spindle (3) mounted to be movable along a first axis and having means for holding a first coupling element (4), a worktable (6) mounted to be movable along a second axis transverse to said first axis, a rotary table (7) mounted for rotation upon said worktable, and a casing (9) fixed to said rotary table comprising an indexing spindle (10) having a shaft rotatably mounted in said casing, a plate (12) fixed to the shaft of said indexing spindle and having a second coupling element (13) and means for periodically joining said first and second coupling elements in accordance with program-controlled motions of said milling machine to cause predetermined angular movements of said indexing spindle.

2. Indexing apparatus as defined in claim 1 wherein said second coupling element (13) comprises a recess formed in said plate (12) for periodic engagement by said first coupling element.

3. Indexing apparatus as defined in claim 1 wherein said first coupling element (4) comprises a pin capable of being clamped in said main spindle (3).

4. Indexing apparatus as defined in claim 1 wherein said plate (12) has a slot (13) formed in the periphery thereof and a pin (4) is clamped in said main spindle (3) whereby engagement of said pin in said slot effects said predetermined angular movements of said indexing spindle.

* * * * *